(12) United States Patent
Matsumura et al.

(10) Patent No.: US 11,126,386 B2
(45) Date of Patent: Sep. 21, 2021

(54) IMAGE FORMING DEVICE, NON-TRANSITORY COMPUTER READABLE MEDIUM, AND INFORMATION PROCESSING SYSTEM

(71) Applicant: FUJIFILM BUSINESS INNOVATION CORP., Tokyo (JP)

(72) Inventors: Ryoji Matsumura, Kanagawa (JP); Hajime Kajiyama, Kanagawa (JP); Hiromi Ichiba, Kanagawa (JP); Kazumoto Shinoda, Kanagawa (JP); Yu Ohtake, Kanagawa (JP); Taku Yoshimura, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 16/857,309

(22) Filed: Apr. 24, 2020

(65) Prior Publication Data

US 2021/0109694 A1    Apr. 15, 2021

(30) Foreign Application Priority Data

Oct. 11, 2019    (JP) .............................. JP2019-187576

(51) Int. Cl.
*G06F 15/00*    (2006.01)
*G06F 3/12*    (2006.01)
*G06K 1/00*    (2006.01)

(52) U.S. Cl.
CPC .......... *G06F 3/1254* (2013.01); *G06F 3/1203* (2013.01)

(58) Field of Classification Search
CPC ............................. G06F 3/1254; G06F 3/1203
USPC ............................... 358/1.15, 1.13, 1.14, 1.1
See application file for complete search history.

(56) References Cited

U.S. PATENT DOCUMENTS

| 2013/0016399 A1* | 1/2013 | Kobayashi | G06F 3/1231 358/1.16 |
| 2013/0194630 A1* | 8/2013 | Kishimoto | G06F 3/1285 358/1.15 |
| 2017/0041488 A1* | 2/2017 | Shibata | H04N 1/32101 |
| 2017/0289369 A1* | 10/2017 | Okayama | G06F 3/1255 |
| 2020/0045193 A1* | 2/2020 | Mori | H04N 1/00474 |

* cited by examiner

*Primary Examiner* — Douglas Q Tran
(74) *Attorney, Agent, or Firm* — Oliff PLC

(57) ABSTRACT

An image forming device includes a processor configured to, when at least a portion of setting information of another image forming device is acquired as transfer information that is new setting information for the image forming device, and setting information having a dependency relationship with the transfer information already exists in the image forming device, update the transfer information in such a way that consistency of the setting information having the dependency relationship is maintained.

6 Claims, 9 Drawing Sheets

FIG. 3A

USER SETTINGS

| USER ID | USERNAME |
|---|---|
| 01 | TARO YOKOHAMA |
| 02 | JIRO TOKYO |
| 03 | SABURO SHINAGAWA |
| 04 | HANAKO KAWASAKI |
| 05 | YUSUKE SHINJUKU |
| ⋮ | ⋮ |

FIG. 3B

CONFIDENTIAL BOX SETTINGS

| BOX ID | USER ID | JOB FLOW ID |
|---|---|---|
| 01 | 03 | |
| 02 | 05 | 01 |
| 03 | 04 | 02 |
| ⋮ | ⋮ | ⋮ |

FIG. 3C

JOB FLOW SETTINGS

| JOB FLOW ID | USER ID | JOB FLOW NAME | JOB FLOW CONTENT |
|---|---|---|---|
| 01 | 04 | SIMULTANEOUS EMAIL TRANSMISSION | EMAIL TRANSMISSION DESTINATIONS 1, 2, 3 |
| 02 | 02 | FACSIMILE TRANSMISSION | FACSIMILE TRANSMISSION DESTINATIONS 5, 6, 7 |
| ⋮ | ⋮ | ⋮ | ⋮ |

FIG. 3D

DESTINATION TABLE

| DESTINATION ID | EMAIL ADDRESS | FACSIMILE NUMBER |
|---|---|---|
| 1 | 0123@00.co.jp | 03-*2**-0123 |
| 2 | 987654321@00.ne.jp | 011-3***-0123 |
| 3 | 0abcde@1230.com | 02-*4**-0193 |
| 4 | a1b1c1@00.co.jp | 04-**5*-0123 |
| 5 | 0123@02.co.jp | 03-**11-0300 |
| 6 | 0abc3@00.com | 03-**6*-0123 |
| 7 | aaaaa@00.co.jp | 03-***7-5120 |
| ⋮ | ⋮ | ⋮ |

FIG. 7A

- ☐ COMMON SETTINGS
- ☐ COPY SETTINGS
- ⋮
- ☑ USER SETTINGS
- ☐ JOB FLOW SETTINGS
- ☐ CONFIDENTIAL BOX SETTINGS
- ☐ DESTINATION TABLE

FIG. 7B

USER SETTINGS

| USER ID | USERNAME |
|---------|----------|
| 01 | JOHN SMITH |
| 02 | HAROLD JOHNSON |
| 03 | JAMES BROWN |
| 04 | DAVID MILLER |
| 05 | THOMAS GONZALES |
| ⋮ | ⋮ |

FIG. 7C

⇩ AFTER TRANSFER

USER SETTINGS

| USER ID | USERNAME |
|---------|----------|
| 01 | JOHN SMITH |
| 02 | HAROLD JOHNSON |
| 03 | JAMES BROWN |
| ⋮ | ⋮ |

FIG. 7D

CONFIDENTIAL BOX SETTINGS

| BOX ID | USER ID | JOB FLOW ID |
|--------|---------|-------------|
| 01 | – | – |
| 02 | – | – |
| 03 | – | – |
| ⋮ | ⋮ | ⋮ |

FIG. 7E

JOB FLOW SETTINGS

| JOB FLOW ID | USER ID | JOB FLOW NAME | JOB FLOW CONTENT |
|-------------|---------|---------------|------------------|
| 01 | – | – | – |
| 02 | – | – | – |
| ⋮ | ⋮ | ⋮ | ⋮ |

FIG. 7F

DESTINATION TABLE

| DESTINATION ID | EMAIL ADDRESS | FACSIMILE NUMBER |
|----------------|---------------|------------------|
| 1 | 0123@00.co.jp | 03-*2**-0123 |
| 2 | 7654321@00.ne.jp | 011-3***-0123 |
| 3 | 0abcde@1230.com | 02-*4**-0193 |
| 4 | a1b1c1@00.co.jp | 04-**5*-0123 |
| 5 | 0123@02.co.jp | 03-**11-0300 |
| 6 | 0abc3@00.com | 03-**6*-0123 |
| 7 | aaaaa@00.co.jp | 03-***7-5120 |
| ⋮ | ⋮ | ⋮ |

FIG. 9A

- ☐ COMMON SETTINGS
- ☐ COPY SETTINGS
- ⋮
- ☐ USER SETTINGS
- ☐ JOB FLOW SETTINGS
- ☑ CONFIDENTIAL BOX SETTINGS
- ☐ DESTINATION TABLE

FIG. 9B

CONFIDENTIAL BOX SETTINGS

| BOX ID | USER ID | JOB FLOW ID |
|---|---|---|
| 01 | 01 | – |
| 02 | 03 | 01 |
| 03 | – | – |
| ⋮ | ⋮ | ⋮ |

FIG. 9C

AFTER TRANSFER

USER SETTINGS

| USER ID | USERNAME |
|---|---|
| 01 | JOHN SMITH |
| 02 | JIRO TOKYO |
| 03 | JAMES BROWN |
| 04 | DAVID MILLER |
| 05 | YUSUKE SHINJUKU |
| ⋮ | ⋮ |

FIG. 9D

CONFIDENTIAL BOX SETTINGS

| BOX ID | USER ID | JOB FLOW ID |
|---|---|---|
| 01 | 01 | – |
| 02 | 03 | 01 |
| 03 | 04 | 02 |
| ⋮ | ⋮ | ⋮ |

FIG. 9E

JOB FLOW SETTINGS

| JOB FLOW ID | USER ID | JOB FLOW NAME | JOB FLOW CONTENT |
|---|---|---|---|
| 01 | 01 | FACSIMILE TRANSMISSION A | FACSIMILE TRANSMISSION DESTINATIONS 8, 9, 10 |
| 02 | 02 | FACSIMILE TRANSMISSION | FACSIMILE TRANSMISSION DESTINATIONS 5, 6, 7 |
| ⋮ | ⋮ | ⋮ | ⋮ |

IMAGE FORMING DEVICE, NON-TRANSITORY COMPUTER READABLE MEDIUM, AND INFORMATION PROCESSING SYSTEM

CROSS-REFERENCE TO RELATED APPLICATIONS

This application is based on and claims priority under 35 USC 119 from Japanese Patent Application No. 2019-187576 filed Oct. 11, 2019.

BACKGROUND

(i) Technical Field

The present disclosure relates to an image forming device, a non-transitory computer readable medium, and an information processing system.

(ii) Related Art

There are cases where a multifunction device that is not in an initial state, that is, in which some kind of setting information has already been set, has transferred thereto the setting information of another different multifunction device or a portion of the previous setting information of the same multifunction device.

SUMMARY

As mentioned above, in a case where a portion of the setting information of a multifunction device is transferred to a multifunction device in which some kind of setting information has already been set, and at such time a dependency relationship exists among multiple setting items included in the setting information that has already been set, inconsistencies may occur in the dependency relationship between the setting information that has already been set and the newly transferred setting information.

Aspects of non-limiting embodiments of the present disclosure relate to ensuring that unintended dependency relationships do not occur in setting information after transfer, in a case where the setting information of an image forming device is to be transferred to another image forming device.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an image forming device including a processor configured to, when at least a portion of setting information of another image forming device is acquired as transfer information that is new setting information for the image forming device, and setting information having a dependency relationship with the transfer information already exists in the image forming device, update the transfer information in such a way that consistency of the setting information having the dependency relationship is maintained.

BRIEF DESCRIPTION OF THE DRAWINGS

An exemplary embodiment of the present disclosure will be described in detail based on the following figures, wherein:

FIGS. 3A to 3D are drawings depicting an example of setting information stored in a setting information storage unit of the multifunction device, with the drawings depicting individual setting data included in the setting items of: user settings (FIG. 3A), confidential box settings (FIG. 3B), job flow settings (FIG. 3C), and a destination table (FIG. 3D);

FIGS. 7A to 7F are drawings illustrating the way in which setting information is transferred in the setting information transfer processing of FIG. 6, with the drawings depicting individual setting data for: a selection screen for setting items to be transferred (FIG. 7A), user settings to be transferred that are stored in a cloud server 100 (FIG. 7B), user settings after transfer (FIG. 7C), confidential box settings after transfer (FIG. 7D), job flow settings after transfer (FIG. 7E), and a destination table after transfer (FIG. 7F);

FIGS. 9A to 9E are drawings illustrating the way in which setting information is transferred in the setting information transfer processing of FIG. 8, with the drawings depicting: a selection screen for setting items to be transferred (FIG. 9A), individual setting data for confidential box settings to be transferred that are stored in the cloud server 100 (FIG. 9B), user settings after transfer (FIG. 9C), confidential box settings after transfer (FIG. 9D), and job flow settings after transfer (FIG. 9E).

DETAILED DESCRIPTION

Figure 1:
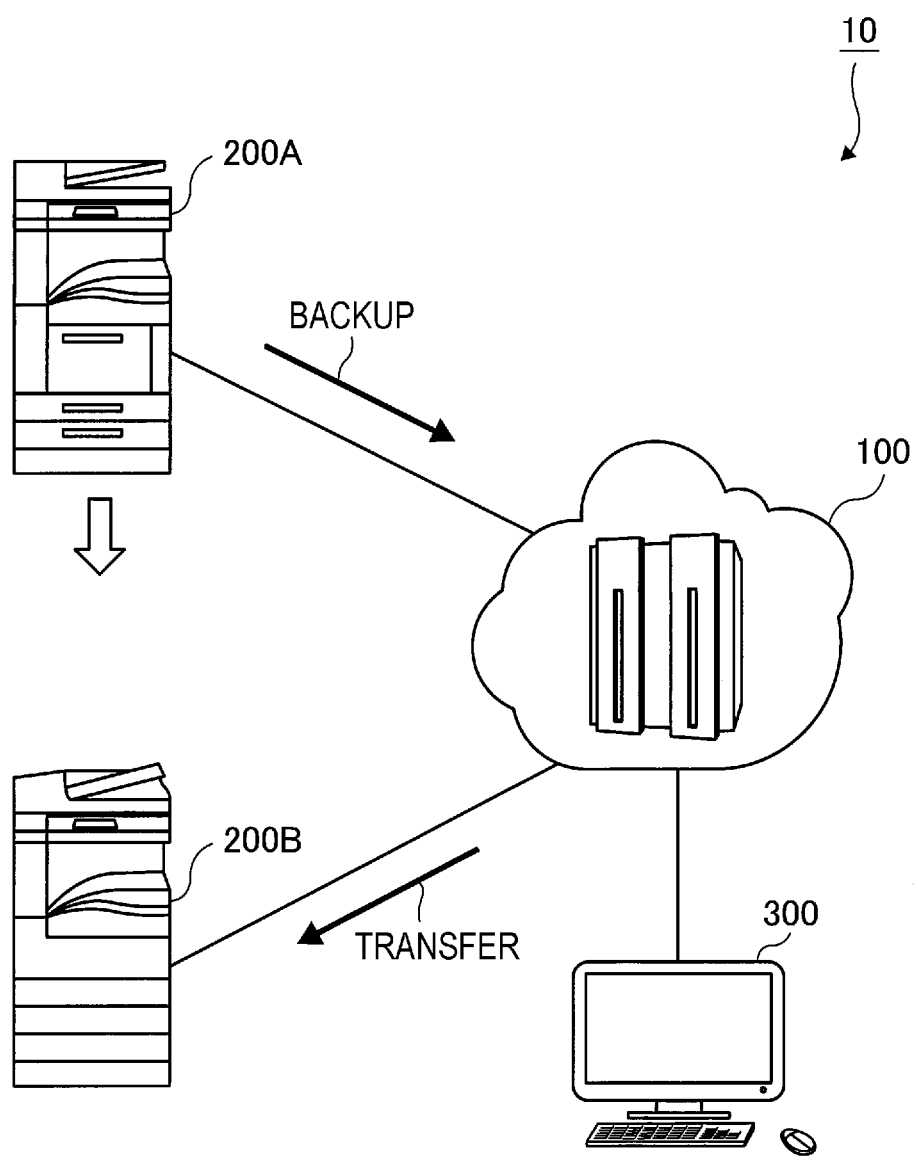
FIG. 1 is an overall schematic view of a backup/transfer system in one exemplary embodiment of the present disclosure.

A backup/transfer system 10 for setting information in one exemplary embodiment of the present disclosure will be described with reference to FIG. 1. It should be noted that FIG. 1 is an overall schematic view of the backup/transfer system 10 for setting information in one exemplary embodiment of the present disclosure. The backup/transfer system 10 for setting information is provided with a cloud server 100, multifunction devices 200A and 200B connected to the cloud server 100 via a network, and a remote operation terminal 300 connected to the cloud server 100 also via the network.

In this backup/transfer system 10 for setting information, there are cases where it is desired for setting information of the multifunction device 200A to be transferred to and used by the multifunction device 200B. For example, in various offices in which a multifunction device is installed, there are cases where it becomes necessary for an old-model multifunction device 200A to be replaced with a newer-model multifunction device 200B. At such time, by operating a web user interface generated by an application of the cloud server 100 and displayed on the remote operation terminal 300, setting information of the old-model multifunction device 200A is temporarily backed up to the cloud server 100, and thereafter the setting information backed up to the cloud server 100 is transferred to the new-model multifunction device 200B.

Incidentally, supposing that the setting information of at least a portion of the setting items, rather than all the setting items, of the setting information of the old-model multifunction device 200A is selected and transferred as new setting information for the transfer-destination multifunction device 200B, and some kind of setting information already exists in the transfer-destination multifunction device 200B and a dependency relationship exists in that setting information of the transfer-destination multifunction device 200B, due to only a portion of the setting items being transferred, there is a possibility that the dependency relationship among items of individual setting data constituting the setting items may break down and inconsistencies may occur, and unintended dependency relationships may occur among the individual data settings. Thus, in the multifunction device 200B of the present exemplary embodiment, transfer information acquired from the cloud server 100 is updated so as to maintain the consistency of setting information that has a dependency relationship.

The cloud server 100 of the present exemplary embodiment provides a web interface for the remote operation terminal 300, the web interface is displayed on a display device of the remote operation terminal 300, and, due to a device administrator operating the web interface, an application program of the cloud server 100 is activated, and setting information that is set in the old-model multifunction device 200A is acquired and backed up to the cloud server 100. Furthermore, the cloud server 100 transfers the setting information that has been backed up to the cloud server 100, to the transfer-destination multifunction device 200B on the basis of an operation carried out from the remote operation terminal 300. It should be noted that the cloud server 100 is not an important part in the present disclosure, and therefore a detailed description thereof is omitted. It should be noted that the cloud server 100 may be a physical server.

Figure 2A:
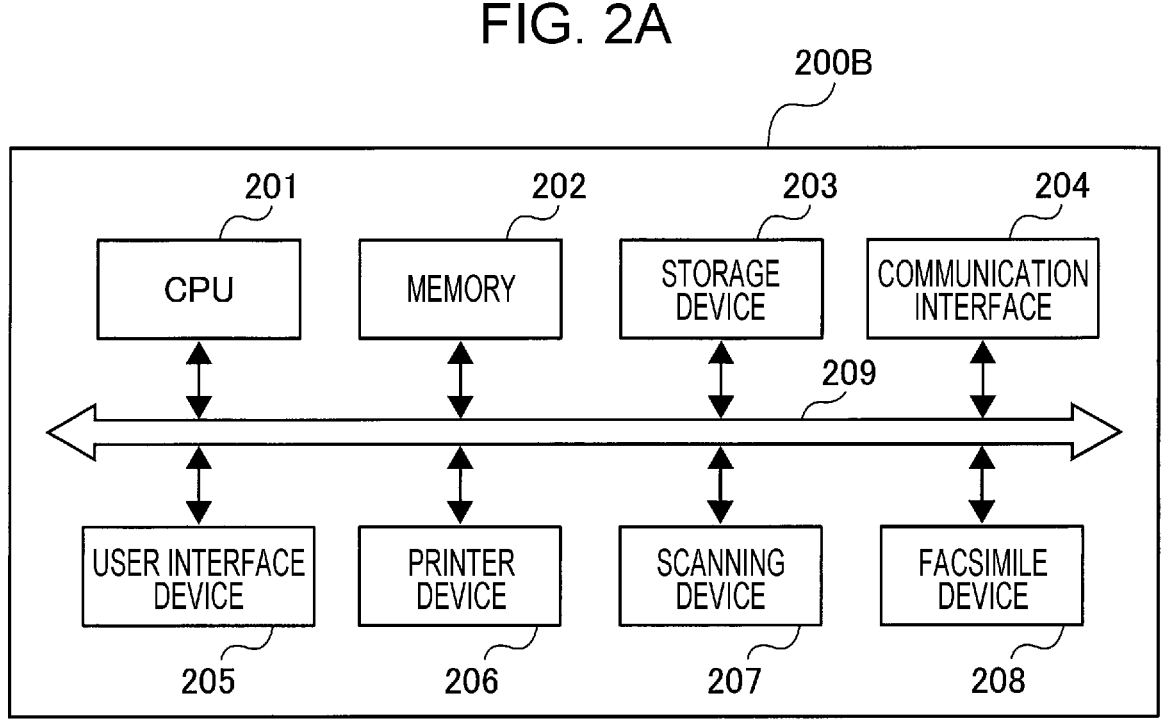
FIG. 2A is a drawing depicting a hardware configuration of a multifunction device.
Figure 2B:
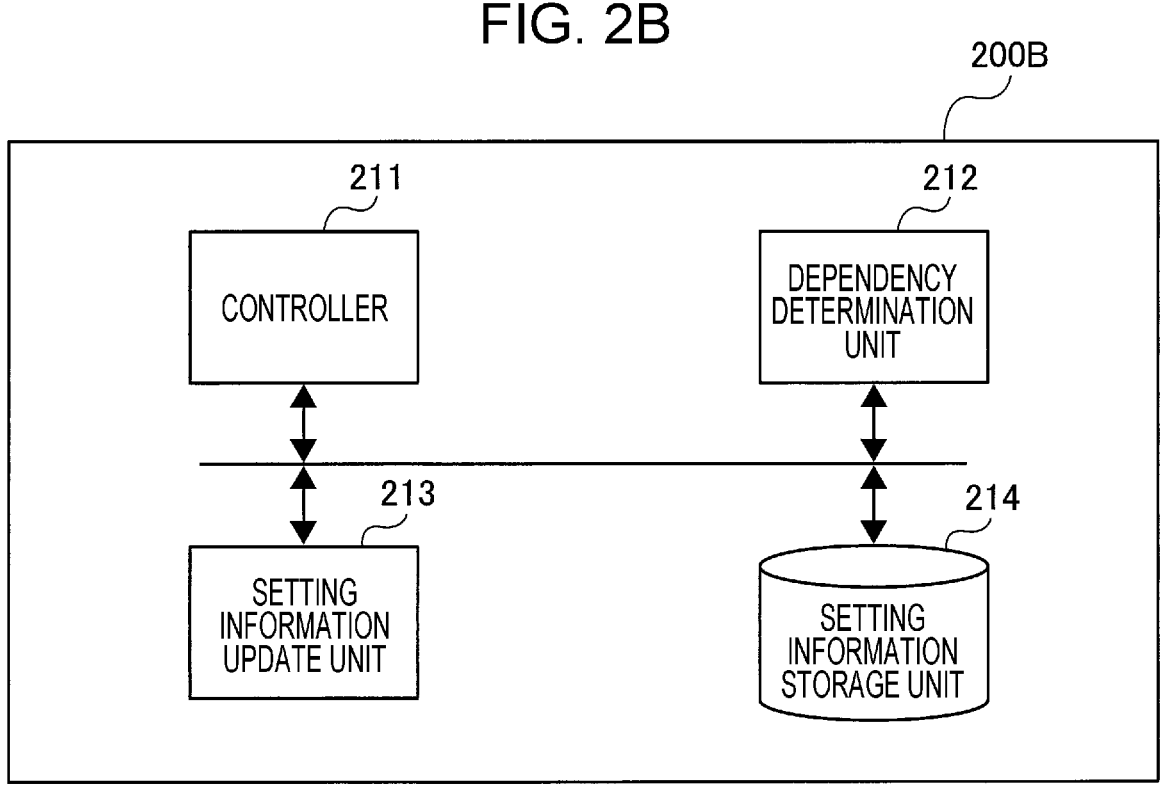
FIG. 2B is a functional block diagram of the multifunction device.

Next, the multifunction device 200B that is the transfer destination for the setting information backed up to the cloud server 100 in the present exemplary embodiment will be described with reference to FIGS. 2A and 2B. It should be noted that FIG. 2A is a drawing depicting the hardware configuration of the multifunction device 200B, and FIG. 2B is a functional block diagram of the multifunction device 200B.

The multifunction device 200B has a CPU 201, a memory 202, a storage device 203, a communication interface 204, a user interface device 205, a printer device 206, a scanning device 207, and a facsimile device 208, which are each connected to a control bus 209.

The CPU 201 is a control microprocessor and controls the operation of each unit in the multifunction device 200B on the basis of a control program stored in the storage device 203.

The memory 202 temporarily stores image data and scanned image data to be printed by the multifunction device 200B. Furthermore, the memory 202 temporarily stores setting information and setting information transfer instructions received from the cloud server 100.

The storage device 203 is constituted by a hard disk drive (abbreviated as HDD) or a solid-state drive (abbreviated as SSD), and a control program for controlling each unit in the multifunction device 200B is stored therein. Furthermore, setting information, which is described later, of the multifunction device 200B is stored in the storage device 203.

The communication interface 204 carries out communication with the cloud server 100 and the remote operation terminal 300 by the multifunction device 200B, and carries out communication control for receiving setting information and so on.

The user interface device 205 is constituted by a liquid crystal display and a touch panel provided in the multifunction device 200B and displays various types of screens on the liquid crystal display, and is able to receive operations and input information by a user or the device administrator operating the touch panel.

The printer device 206 prints, onto paper, images transmitted from an undepicted computer terminal connected to the multifunction device 200B via the network. The scanning device 207 reads in image data from a document placed on a document holder, stores the image data in the memory 202, and transmits the image data to an undepicted computer terminal connected to the multifunction device 200B via the network. The facsimile device 208 transmits, to another multifunction device or facsimile device via a telephone line, image data read in by the scanning device 207 and stored in the memory 202, or image data transmitted from an undepicted computer terminal and stored in the memory 202. It should be noted that detailed descriptions are omitted for the printer device 206, the scanning device 207, and the facsimile device 208.

As depicted in FIG. 2B, the multifunction device 200B performs the functions of a controller 211, a dependency determination unit 212, a setting information update unit 213, and a setting information storage unit 214, by the control program stored in the storage device 203 being executed in the CPU 201.

The controller 211 receives setting information transfer instructions from the cloud server 100, terminates transfer processing, notifies errors indicating that transfer processing is not possible, and so on.

The dependency determination unit 212 determines whether or not a dependency relationship exists among the setting items of setting information stored in the setting information storage unit 214 of the multifunction device 200B, and determines whether a setting item to be transferred from the cloud server 100 matches a setting item deemed as having a dependency relationship, or is included in setting items deemed as having a dependency relationship. Furthermore, for each item of individual setting data received from the cloud server 100, the dependency determination unit 212 determines whether or not a dependency relationship exists with the individual setting data included in other setting items.

The setting information update unit 213 updates the individual setting data of a corresponding setting item in the setting information storage unit 214 of the multifunction device 200B, with the individual setting data included in a setting item to be transferred that is acquired from the cloud server 100, under the conditions described hereinafter. Alternatively, the setting information update unit 213 deletes all individual setting data of the setting item that is a target for transfer and the setting items that have a dependency relationship with the setting item, in the setting information storage unit 214, and then replaces the deleted individual setting data with the individual setting data of the setting item to be transferred that is acquired from the cloud server 100, as new setting information. Alternatively, the setting information update unit 213 updates the individual setting data belonging to a corresponding setting item in the multifunction device 200B, with the individual setting data belonging to a specific setting item acquired from the cloud server 100.

Figure 4:
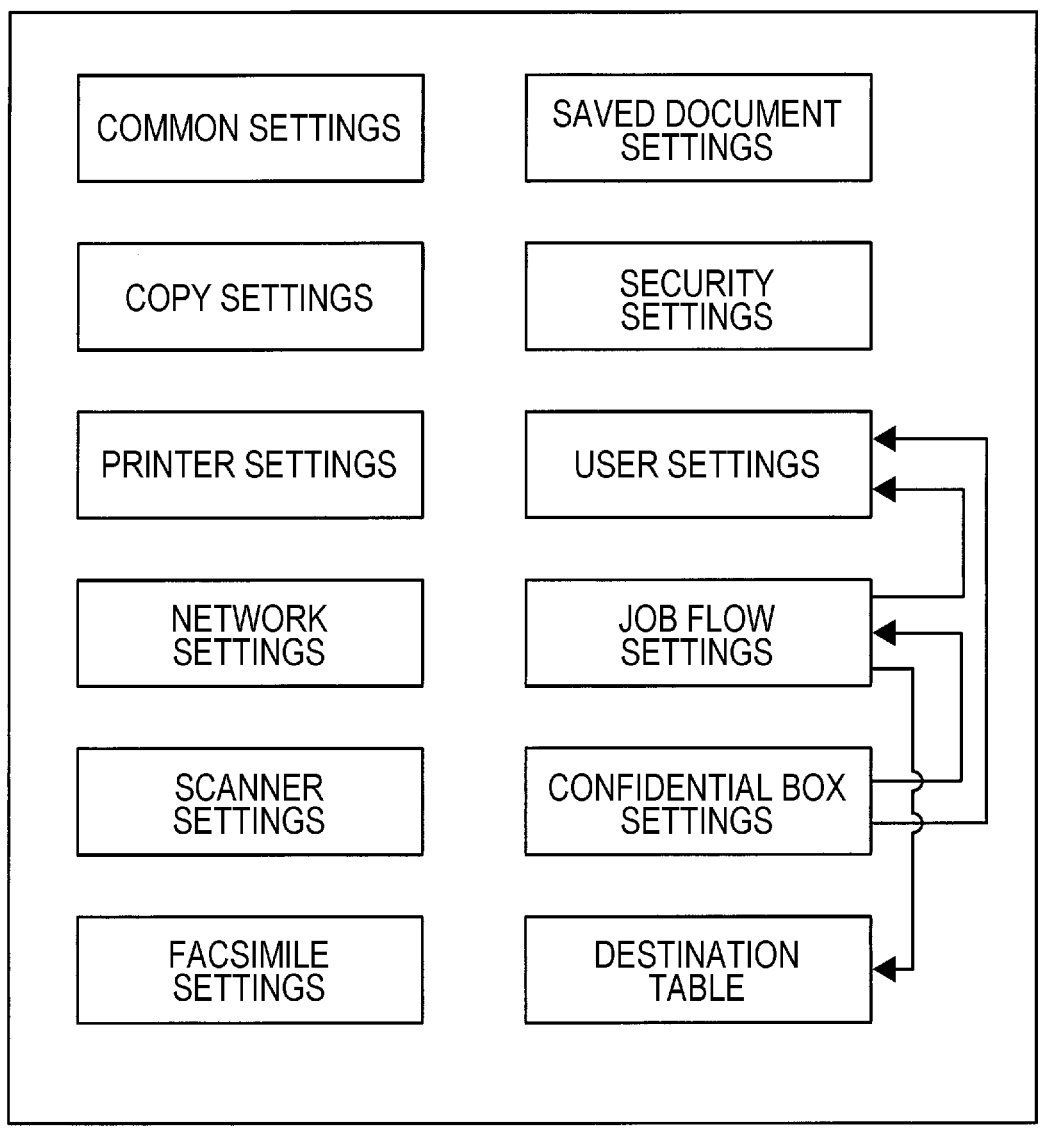
FIG. 4 is a drawing depicting a dependency relationship among setting items of the setting information stored in the setting information storage unit of the multifunction device.

The setting information storage unit 214 stores setting item information of the multifunction device 200B and individual setting data belonging to each setting item. Here, the setting information stored in the setting information storage unit of the multifunction device 200B will be described with reference to FIGS. 3 and 4. It should be noted that FIGS. 3A to 3D are drawings depicting examples of setting information stored in the setting information storage unit of the multifunction device 200B, and FIG. 4 is a drawing depicting a dependency relationship among setting items of the setting information stored in the setting information storage unit of the multifunction device 200B.

The setting information in the present exemplary embodiment is a list of set values with which how each function of the multifunction device 200B is to be executed and who is to execute each function are stored in advance, and includes setting items such as user settings, confidential box settings, job flow settings, and a destination table. Each setting item is constituted by multiple items of individual setting data. As depicted in FIG. 3A, "user ID" and "username" are included in the user settings, and, for example, the usernames "Taro Yokohama", "Jiro Tokyo", and so on are set as individual setting data for the user IDs 01, 02, and so on, respectively.

As depicted in FIG. 3B, a "box ID", a "user ID", and a "job flow ID" are associated in the confidential box settings. In FIG. 3B, for example, the user ID "03" is linked with the box ID "01" as individual setting data, the user ID "05" and the job flow ID "01" are linked with the box ID "02" as individual setting data, and the user ID "04" and the job flow ID "02" are linked with the box ID "03" as individual setting data.

As depicted in FIG. 3A, a "job flow ID", a "user ID", a "job flow name", and "job flow content" are associated in the job flow settings. In FIG. 3C, for example, the user ID "04", the job flow name "simultaneous email transmission", and the job flow content "email transmission: destinations 1, 2, 3" are linked with the job flow ID "01" as individual setting data, and the user ID "02", the job flow name "facsimile transmission", and the job flow content "facsimile transmission: destinations 5, 6, 7" are linked with the job flow ID "02" as individual setting data.

In addition, as depicted in FIG. 3D, in the destination table, "email addresses" and a "facsimile numbers" are associated with "destination IDs".

FIG. 4 depicts a list of these setting items of the setting information and dependency relationships. As depicted in FIG. 4, multiple setting items such as "common settings", "copy settings", "printer settings", "network settings", "scanner settings", "facsimile settings", "saved document settings", "security settings", "user settings", "job flow settings", "confidential box settings", and "destination table" are included in the setting information of the multifunction device 200B.

Here, as depicted in FIG. 4, "user settings" is a dependency destination for the "job flow settings" and the "confidential box settings". That is, the "job flow settings" and the "confidential box settings" are dependent on the "user settings". Consequently, supposing that the individual setting data included in the user settings changed, there is a possibility that the information of the user referenced by the job flow settings and the confidential box settings may also change.

Furthermore, the "job flow settings" is a reference destination for the "confidential box settings", as well as being dependent on the "user settings" and the "destination table". This means that the destination table is referenced when a specific job flow is executed, and that a specific job flow of the "job flow settings" is referenced and executed when a document is saved in a confidential box.

In addition, the "confidential box settings" is dependent on the "user settings" and the "job flow settings". Furthermore, the "destination table" is a reference destination for the "job flow settings".

The remote operation terminal 300 is a personal computer or a tablet computer terminal connected to the cloud server 100 via the network, and is provided with a memory and a control processor that controls the operation of each unit, and a user interface device including a display device such as a liquid crystal display and input devices such as a keyboard and mouse or a touch panel. This remote operation terminal 300 merely functions as a user interface for the cloud server 100, displaying a web user interface provided by the cloud server 100 and carrying out input operations, and therefore a detailed description thereof is omitted.

Next, transfer processing for setting information in the multifunction device 200B will be described with reference to FIG. 5. It should be noted that FIG. 5 is a flowchart depicting the flow of a first example of setting information transfer processing in the multifunction device 200B.

First, prior to the processing in the multifunction device 200B, the device administrator operates the remote operation terminal 300 to thereby select which setting items are to be transferred to the multifunction device 200B from among the setting information backed up to the cloud server 100, and to instruct the cloud server 100 to execute transfer processing. The cloud server 100 transmits a transfer processing instruction for setting information to the transfer-destination multifunction device 200B. It should be noted that this transfer processing instruction includes information regarding the setting items of the setting information selected by the device administrator. Furthermore, this transfer processing instruction may include individual setting data included in a setting item to be transferred.

Figure 5:
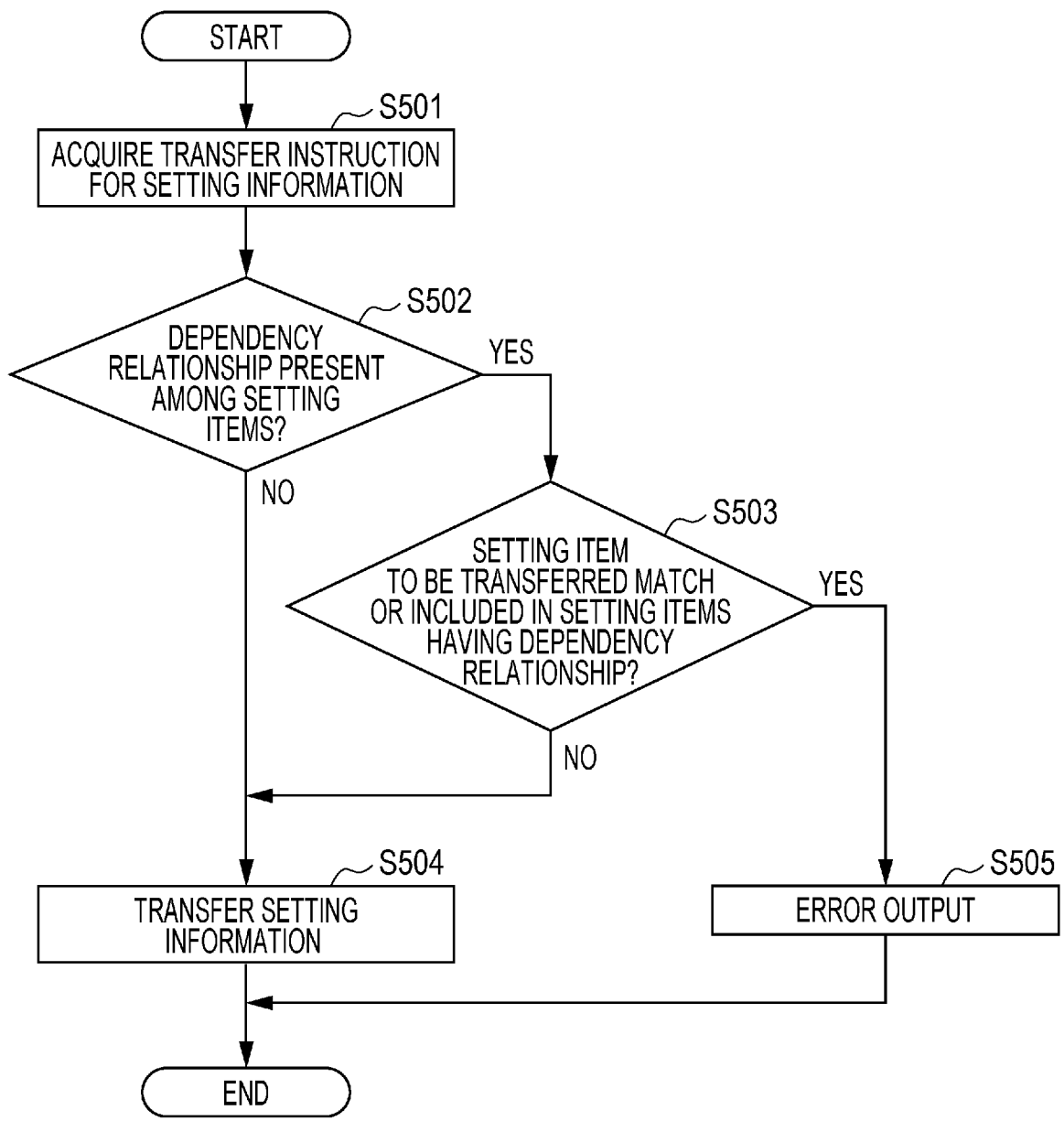
FIG. 5 is a flowchart depicting the flow of a first example of setting information transfer processing in the multifunction device.

In step S501 in FIG. 5, the controller 211 of the multifunction device 200B receives the setting information transfer instruction from the cloud server 100.

In step S502, the dependency determination unit 212 determines whether or not a dependency relationship exists among the setting items of the setting information stored in the setting information storage unit 214 of the multifunction device 200B. If it is determined that there is no dependency relationship among the setting items of the setting information stored in the setting information storage unit 214, processing proceeds to step S504.

On the other hand, if it is determined that there is a dependency relationship among the setting items of the setting information stored in the setting information storage unit 214, processing proceeds to step S503, and the dependency determination unit 212 additionally determines whether or not the setting item to be transferred from the cloud server 100 matches a setting item deemed as having a dependency relationship, or is included in setting items deemed as having a dependency relationship, stored in the setting information storage unit 214 of the multifunction device 200B. If it is determined that the setting item to be transferred does not match a setting item determined as having a dependency relationship in the aforementioned step S502, or is not included in setting items having a dependency relationship, processing proceeds to step S504.

In step S504, the setting information update unit 213 acquires individual setting data included in the setting item to be transferred from the cloud server 100, updates the individual setting data of the corresponding setting item in the setting information storage unit 214 of the multifunction device 200B, and ends the processing. It should be noted that if the individual setting data included in the setting item to be transferred is acquired together with a setting information transfer instruction from the cloud server 100, the individual setting data of the corresponding setting item in the setting information storage unit 214 of the multifunction device 200B is updated with the acquired individual setting data, and the processing is ended. That is, in step S504, if a dependency relationship does not exist among multiple setting items constituting the setting information of the multifunction device 200B, or if a dependency relationship does not exist with the setting item corresponding to the setting item to be transferred from the cloud server 100, the setting information update unit 213 permits the items of individual setting data belonging to the setting item in question to be updated with the individual setting data acquired from the cloud server 100.

In step S503, if it is determined that the setting item to be transferred and a setting item determined as having a dependency relationship in the aforementioned step S502 match, or the setting item to be transferred is included in setting items determined as having a dependency relationship in the aforementioned step S502, processing proceeds to step S505. That is, if there is a dependency relationship among multiple setting items constituting the setting information stored in the multifunction device 200B, particularly with the setting item to be transferred, processing proceeds to step S505.

In step S505, the controller 211 terminates the transfer processing. That is, the controller 211 prohibits items of individual setting data belonging to a setting item that has a dependency relationship in the aforementioned S503 from being updated according to the individual setting data acquired from the cloud server 100, additionally notifies the cloud server 100 of an error indicating that transfer processing is not possible due to setting information having a dependency relationship already being set in the multifunction device 200B, and ends the processing. In this case, the cloud server 100 displays an error on the user interface displayed on the remote operation terminal 300.

Figure 6:
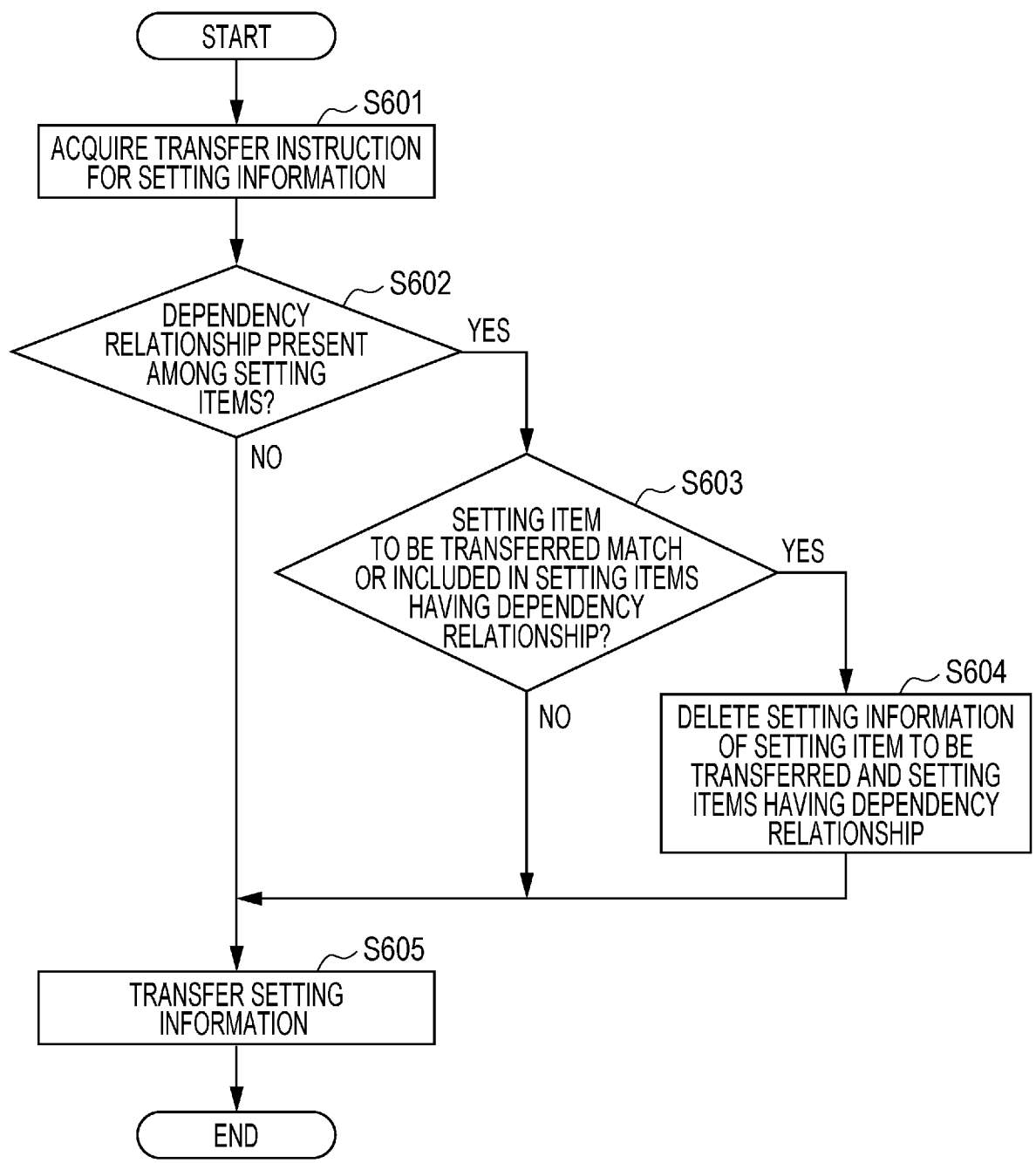
FIG. 6 is a flowchart depicting the flow of a second example of setting information transfer processing in the multifunction device.

Next, a second example of transfer processing for setting information in the multifunction device 200B will be described with reference to FIGS. 6 and 7A to 7F. It should be noted that FIG. 6 is a flowchart depicting the flow of the second example of setting information transfer processing in the multifunction device 200B, and FIGS. 7A to 7F are drawings illustrating the way in which setting information is transferred in the setting information transfer processing of FIG. 6.

It should be noted that, in the aforementioned first example, if it is determined that there is a dependency relationship with the setting item to be transferred, among the setting information already set in the transfer-destination multifunction device 200B, the transfer processing for the setting information is terminated, and the setting information of the transfer-destination multifunction device 200B is not rewritten. However, in the second example hereinafter, if it is determined that there is a dependency relationship with the setting item to be transferred, among the setting information already set in the transfer-destination multifunction device 200B, individual setting data belonging to a setting item determined as having the dependency relationship is deleted and replaced with new setting information acquired from the cloud server 100.

It should be noted that, similar to the aforementioned first example, prior to the processing in the multifunction device 200B, the device administrator operates the remote operation terminal 300 to thereby select which setting item setting information is to be transferred to the multifunction device 200B from among the setting information backed up to the cloud server 100, and to instruct the execution of transfer processing. For example, in the second example, it is assumed that only the "user settings" setting item is selected to be transferred to the multifunction device 200B from among the setting information of the multifunction device 200A backed up to the cloud server 100, as depicted in FIG. 7A.

The cloud server 100 transmits a transfer processing instruction for setting information to the transfer-destination multifunction device 200B. It should be noted that this transfer processing instruction includes information regarding the setting item of the setting information selected by the device administrator, namely information indicating that the setting item to be transferred is the "user settings". Furthermore, the transfer processing instruction may include individual setting data included in the setting item to be transferred. It should be noted that the setting information of the "user settings" of the multifunction device 200A backed up to the cloud server 100, which is to be transferred to the multifunction device 200B, has the content depicted in FIG. 7B.

In step S601 in FIG. 6, the controller 211 of the multifunction device 200B receives a setting information transfer instruction from the cloud server 100.

In step S602, the dependency determination unit 212 determines whether or not a dependency relationship exists among the setting items of the setting information stored in the setting information storage unit 214 of the multifunction device 200B. If it is determined that there is no dependency relationship among the setting items of the setting information stored in the setting information storage unit 214, processing proceeds to step S605.

On the other hand, if it is determined that there is a dependency relationship among the setting items of the setting information stored in the setting information storage unit 214, processing proceeds to step S603. For example, if dependency relationships such as those depicted in FIG. 4 are set among the setting items of the setting information of the multifunction device 200B, processing proceeds to step S603.

In step S603, the dependency determination unit 212 determines whether or not the setting item to be transferred from the cloud server 100 matches a setting item deemed as having a dependency relationship, or is included in setting items deemed as having a dependency relationship, stored in the setting information storage unit 214 of the multifunction device 200B. If it is determined that the setting item to be transferred does not match a setting item determined as having a dependency relationship in the aforementioned step S602, or is not included in setting items having a dependency relationship, processing proceeds to step S605.

On the other hand, if it is determined that the setting item to be transferred matches a setting item determined as having a dependency relationship in the aforementioned step S602, or is included in setting items having a dependency relationship, processing proceeds to step S604. That is, if there is a dependency relationship among multiple setting items including the setting item to be transferred, processing proceeds to step S604. It should be noted that in the case of the example depicted in FIGS. 3, 4, and 7, the setting item to be transferred is "user settings", and "user settings" is included among the setting items deemed as having dependency relationships in the multifunction device 200B, and therefore processing proceeds to step S604.

In step S604, the setting information update unit 213 deletes all individual setting data belonging to the setting item corresponding to the setting item to be transferred, and the setting items that have a dependency relationship with the setting item in question, in the setting information storage unit 214 of the multifunction device 200B. That is, the setting information update unit 213 deletes the individual setting data included in "user settings", and the individual setting data included in "job flow settings" and "confidential box settings" which are setting items in a dependency relationship with "user settings", and processing proceeds to step S605. However, the individual setting data included in the "destination table" setting item is not in a direct dependency relationship with the "user settings" setting item and is therefore not deleted.

In step S605, the setting information update unit 213 causes the individual setting data included in the setting item to be transferred that is acquired from the cloud server 100 to be stored for the setting item in question in the setting information storage unit 214, namely to replace the deleted individual setting data as new setting information, and ends the processing. As a result, if there is a dependency relationship between the setting item corresponding to the setting item to be transferred from the cloud server 100, and another setting item, which constitute setting information initially set in the multifunction device 200B, each item of setting data belonging to the setting items having the dependency relationship is deleted, and the individual setting data belonging to the setting item of the transfer information corresponding to the setting item in question is set as new setting information.

The state at such time is depicted in FIGS. 7A to 7F. As is apparent when comparing FIGS. 3A to 3D and 7A to 7F, the individual setting data of the "user settings" setting item is all replaced with new individual setting data, namely the "user settings" information that is backed up to the cloud server 100 from the multifunction device 200A or stored. Furthermore, the individual setting data of the "confidential box settings" and "job flow settings" setting items that had dependency relationships with the "user settings" setting item have an empty state in the multifunction device 200B.

Figure 8:
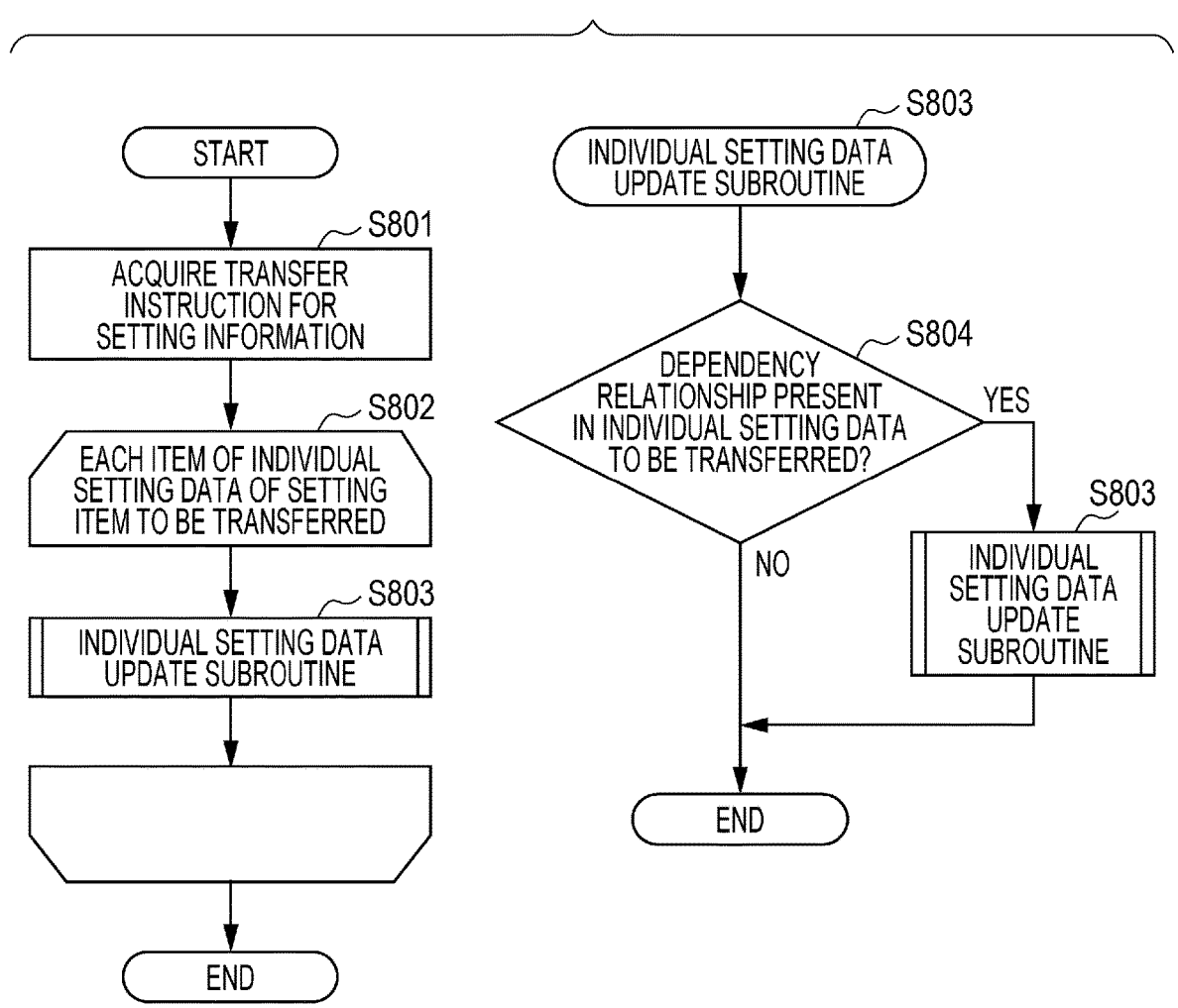
FIG. 8 is a flowchart depicting the flow of a third example of setting information transfer processing in the multifunction device.

Next, a third example of transfer processing for setting information in the multifunction device 200B will be described with reference to FIGS. 8 and 9A to 9E. It should be noted that FIG. 8 is a flowchart depicting the flow of the third example of setting information transfer processing in the multifunction device 200B, and FIGS. 9A to 9E are drawings illustrating the way in which setting information is transferred in the setting information transfer processing of FIG. 8.

It should be noted that, in the aforementioned second example, from among the setting information already set in the transfer-destination multifunction device 200B, the individual setting data of a setting item deemed as having a dependency relationship with the setting item to be transferred is deleted, and then the individual setting data of the setting item to be transferred that is acquired from the cloud server 100 is newly set. However, in the third example hereinafter, it is checked whether first individual setting data included in a setting item that is new transfer information has any kind of dependency relationship with the individual setting data of another setting item. If there is a dependency relationship, for example, if there is a dependency relationship with second individual setting data belonging to another setting item, individual setting data corresponding to the second individual setting data is updated with the second individual setting data, and individual setting data corresponding to the first individual setting data is updated with the first individual setting data, and it is thereby ensured that an inconsistency in the dependency relationship does not occur with the setting information after transfer.

It should be noted that, similar to the aforementioned first and second examples, prior to the processing in the multifunction device 200B, the device administrator operates the remote operation terminal 300 to thereby select which setting item setting information is to be transferred to the multifunction device 200B from among the setting information backed up to the cloud server 100, and to instruct the execution of transfer processing. For example, in the third example, it is assumed that the "confidential box settings" setting item is selected to be transferred to the multifunction device 200B from among the setting information of the multifunction device 200A backed up to the cloud server 100, as depicted in FIG. 9A.

The cloud server 100 transmits a transfer processing instruction for setting information to the transfer-destination multifunction device 200B. It should be noted that this transfer processing instruction indicates information regarding the setting item of the setting information selected by the device administrator, namely information indicating that the setting item to be transferred is the "confidential box settings". Furthermore, the transfer processing instruction may include individual setting data included in the setting item to be transferred. It should be noted that the setting information of the "confidential box settings" of the multifunction device 200A backed up to the cloud server 100, which is to be transferred to the multifunction device 200B, has the content depicted in FIG. 9B.

In step S801 in FIG. 8, the controller 211 of the multifunction device 200B receives a setting information transfer instruction from the cloud server 100.

In step S802, the setting information update unit 213 executes a data update subroutine S803 described later, for each item of individual setting data included in the setting item to be transferred that is received from the cloud server 100.

In step S804 of the data update subroutine, the dependency determination unit 212 determines whether or not individual setting data acquired from the cloud server 100 has a dependency relationship with individual setting data belonging to another setting item. For example, user ID "01" is set in the individual setting data of box ID "01" belonging to the "confidential box settings" setting item in FIG. 9B. That is, the individual setting data of user ID "01" belonging to the setting item of the user settings is linked to the individual setting data of box ID "01", and therefore it is determined that there is a dependency relationship.

In this case, the data update subroutine S803 is additionally executed for user ID "01". As is apparent when referring to the user settings of FIG. 3A, individual setting data belonging to another setting item is not linked with user ID "01", and therefore the setting information update unit 213 updates the individual setting data of user ID "01" in the setting information storage unit 214 of the multifunction device 200B, with the individual setting data "Taro Yokohama" that is set for user ID "01" acquired from the cloud server 100 (that is, executes the processing of step S805).

In step S805, the setting information update unit 213 replaces the individual setting data of confidential box ID "01" in the setting information storage unit 214 of the multifunction device 200B, with the individual setting data that is set for confidential box ID "01" acquired from the cloud server 100, and ends the data update subroutine for the confidential box ID "01", and processing returns to step S802. Next, the setting information update unit 213 executes the data update subroutine for the individual setting data of box ID "02", and, once the subroutine has finished executing for all individual setting data included in the confidential box settings, ends the processing.

As a result, as is apparent when comparing FIGS. 3A and 9C, for the individual setting items of the "user settings" setting item after transfer, stored in the setting information storage unit 214 of the multifunction device 200B, the user IDs "01", "03", and "04" are replaced with "John Smith", "James Brown", and "David Miller", respectively, whereas the individual setting data initially set in the multifunction device 200B for the user IDs "02" and "05" is maintained.

Furthermore, as is apparent when comparing FIGS. 3C and 9E, for the individual setting items of the "job flow settings" setting item after transfer, stored in the setting information storage unit 214 of the multifunction device 200B, the "user ID", "job flow name", and "job flow content" for job flow ID "01" have been replaced with "01", "facsimile transmission A", and "facsimile transmission: destinations 8, 9, 10", respectively, whereas the individual setting data initially set in the multifunction device 200B for the job flow ID "02" is maintained.

In this way, in the aforementioned third example, the setting information initially set in the multifunction device 200B is not all deleted and is partially rewritten with transfer information acquired from the cloud server 100, and therefore the information initially set in the multifunction device 200B can also be used while avoiding inconvenience occurring in the dependency relationships among the setting items of setting information.

It should be noted that, in the aforementioned third example, a description has been given regarding an example in which it is determined whether or not individual setting data having a dependency relationship exists for each item of individual setting data to be transferred to the multifunction device 200B; however, the present disclosure is not restricted thereto, and a configuration may be adopted in which it is determined whether or not a dependency relationship exists for each item of individual setting data of setting information stored in the multifunction device 200B. For example, a configuration may be adopted in which, in a case where first individual setting data stored in the multifunction device 200B has a dependency relationship with second individual setting data belonging to another setting item, updating the first individual setting data and the second individual setting data that have a dependency relationship using new transfer information is prohibited, and in a case where first individual setting data does not have a dependency relationship with second individual setting data belonging to another setting item, updating the first individual setting data and the second individual setting data using new transfer information is permitted.

It should be noted that, in the exemplary embodiment above, a description has been given regarding an example in which setting information of the multifunction device 200A is backed up to the cloud server 100 and subsequently transferred to the multifunction device 200B; however, the present disclosure is not restricted thereto, and a configuration may be adopted in which restoration and transfer processing is executed with the multifunction devices 200A and 200B being connected to a computer terminal without using the cloud server 100.

In addition, in the exemplary embodiment above, a description has been given regarding an example in which setting information of the old-model multifunction device 200A is transferred to the comparatively new-model multifunction device 200B; however, the present disclosure is not restricted thereto, and the multifunction device that backs up setting information and the multifunction device that transfers setting information may be the same. That is, the present disclosure may also be applied in a case where setting information that has been backed up at some point in the past is later transferred, in other words, restored.

It should be noted that, in the exemplary embodiment above, the term "processor" refers to hardware in a broad sense. Examples of a processor include general processors (e.g., CPUs: central processing units) and dedicated processors (e.g., GPUs: graphics processing units, ASICs: application integrated circuits, FPGAs: field programmable gate arrays, and programmable logic devices).

In the exemplary embodiment above, the term "processor" is broad enough to encompass one processor or plural processors in collaboration which are located physically apart from each other but may work cooperatively. Furthermore, the order of operations of the processor is not limited to one described in the exemplary embodiment above, and may be changed.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An image forming device comprising:
   a processor configured to:
   when at least a portion of setting information of another image forming device is acquired as transfer information that is new setting information for the image forming device, and setting information having a dependency relationship with the transfer information already exists in the image forming device,
   update the transfer information in such a way that consistency of the setting information having the dependency relationship is maintained;
   when each item of individual setting information included in a plurality of setting items constituting the setting information is updated using the transfer information, in a case where first individual setting information has a dependency relationship with second individual setting information belonging to another setting item,
   prohibit updating of the first individual setting information and the second individual setting information that have the dependency relationship using the transfer information; and
   in a case where the first individual setting information does not have a dependency relationship with the second individual setting information,
   permit updating of the first individual setting information and the second individual setting information using the transfer information.

2. The image forming device according to claim 1,
wherein the processor is further configured to:
  in a case where there is a dependency relationship among a plurality of setting items constituting the setting information,
  prohibit updating each item of individual setting information belonging to the setting items having the dependency relationship.

3. The image forming device according to claim 1,
wherein the processor is further configured to:
  in a case where a dependency relationship does not exist among a plurality of setting items constituting the setting information,
  permit updating each item of individual setting information belonging to the setting items that do not have a dependency relationship.

4. The image forming device according to claim 1,
wherein the processor is further configured to:
  in a case where there is a dependency relationship among a plurality of setting items constituting the setting information,
  delete each item of individual setting information belonging to the setting items having the dependency relationship; and
  set, as new setting information, individual setting information belonging to setting items of the transfer information corresponding to the setting items having the dependency relationship.

5. An image forming device comprising:
a processor configured to:
  when at least a portion of setting information of another image forming device is acquired as transfer information that is new setting information for the image forming device, and setting information having a dependency relationship with the transfer information already exists in the image forming device,
  update the transfer information in such a way that consistency of the setting information having the dependency relationship is maintained;
  when each item of individual setting information included in a plurality of setting items constituting the setting information is updated using the transfer information,
  in a case where first individual setting information included in the transfer information has a dependency relationship with second individual setting information belonging to another setting item,
  update individual setting information corresponding to the second individual setting information, with the second individual setting information; and
  update individual setting information corresponding to the first individual setting information, with the first individual setting information.

6. A non-transitory computer readable medium storing a program causing a computer constituting an image forming device to execute a process comprising:
  when at least a portion of setting information of another image forming device is acquired as transfer information that is new setting information for the image forming device, and setting information having a dependency relationship with the transfer information already exists in the image forming device,
  updating the transfer information in such a way that consistency of the setting information having the dependency relationship is maintained;
  when each item of individual setting information included in a plurality of setting items constituting the setting information is updated using the transfer information,
  in a case where first individual setting information has a dependency relationship with second individual setting information belonging to another setting item,
  prohibiting updating of the first individual setting information and the second individual setting information that have the dependency relationship using the transfer information; and
  in a case where the first individual setting information does not have a dependency relationship with the second individual setting information,
  permitting updating of the first individual setting information and the second individual setting information using the transfer information.

* * * * *